United States Patent [19]

Hughes-Hartogs

[11] Patent Number: 4,679,227
[45] Date of Patent: Jul. 7, 1987

[54] ENSEMBLE MODEM STRUCTURE FOR IMPERFECT TRANSMISSION MEDIA

[75] Inventor: Dirk Hughes-Hartogs, Morgan Hill, Calif.

[73] Assignee: Telebit Corporation, Cupertino, Calif.

[21] Appl. No.: 736,200

[22] Filed: May 20, 1985

[51] Int. Cl.$^4$ .................. H04M 11/00; H04B 15/00; H04L 5/00

[52] U.S. Cl. ........................................ 379/98; 375/39; 375/58; 370/19; 455/63; 455/68

[58] Field of Search ............... 179/2 DP; 375/38, 40, 375/58, 39, 118; 370/16, 19; 455/63, 68; 340/825.15

[56] References Cited

U.S. PATENT DOCUMENTS

| | | | |
|---|---|---|---|
| 4,047,153 | 9/1977 | Thirion | 375/40 X |
| 4,206,320 | 6/1980 | Keasler et al. | 375/38 X |
| 4,315,319 | 2/1982 | White | 455/63 X |
| 4,438,511 | 3/1984 | Baran | 370/19 |
| 4,459,701 | 7/1984 | Lamiral et al. | 375/118 X |
| 4,494,238 | 1/1985 | Groth, Jr. | 375/40 X |
| 4,495,619 | 1/1985 | Acompora | 375/58 X |
| 4,555,790 | 11/1985 | Betts et al. | 375/39 |
| 4,559,520 | 12/1985 | Johnston | 370/19 X |
| 4,573,133 | 2/1986 | White | 455/63 X |
| 4,574,244 | 3/1986 | Head | 375/39 |
| 4,601,044 | 7/1986 | Kromer, III et al. | 375/118 X |

OTHER PUBLICATIONS

Johnson, "PC Communications: The Revolution is Coming", Telecommunications, vol. 19, No. 10, issued Oct. 1985, pp. 58j-58r.

Information Theory and Reliable Communication, pp. 383-431, John Wiley & Sons, New York, 1968.

Primary Examiner—Gene Z. Rubinson
Assistant Examiner—M. Connors
Attorney, Agent, or Firm—Townsend and Townsend

[57] ABSTRACT

A high-speed modem that transmits and receives digital data on an ensemble of carrier frequencies spanning the usable band of a dial-up telephone line. The modem includes a system for variably allocating data and power among the carriers to compensate for equivalent noise and to maximize the data rate. Additionally, systems for eliminating the need for an equalization network, for adaptively allocating control of a channel, and for tracking variations in line parameters are disclosed.

17 Claims, 13 Drawing Figures

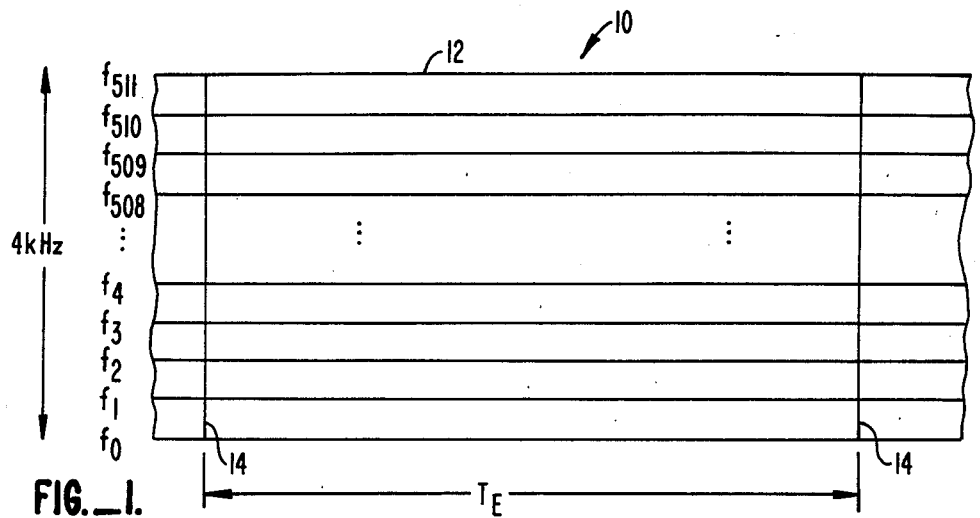
FIG._1.
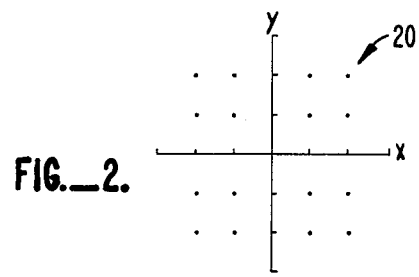
FIG._2.
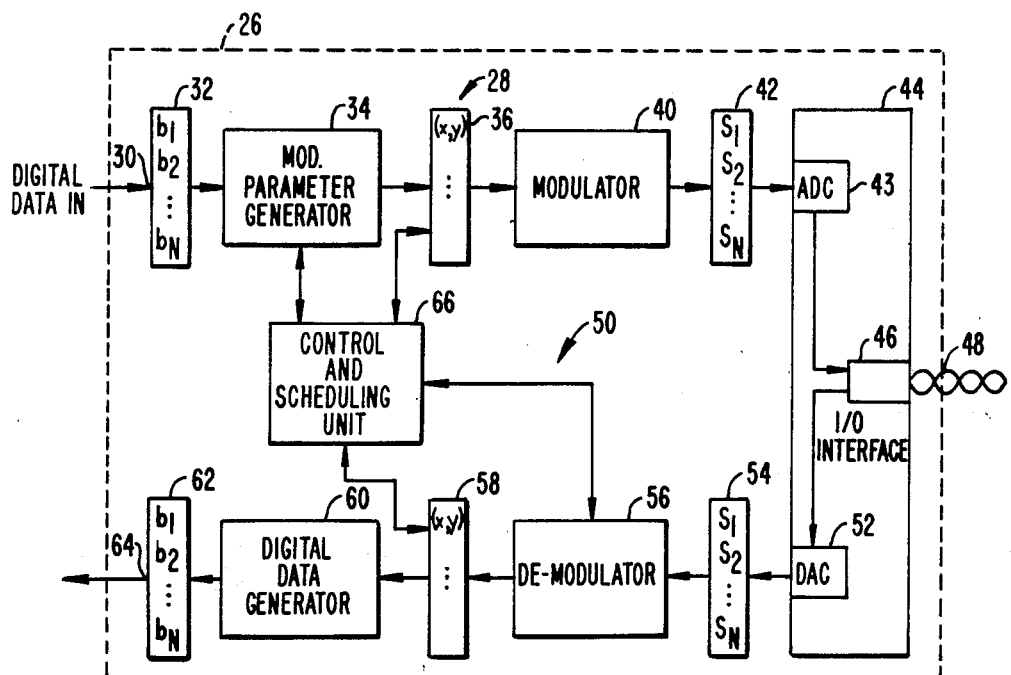
FIG._3.

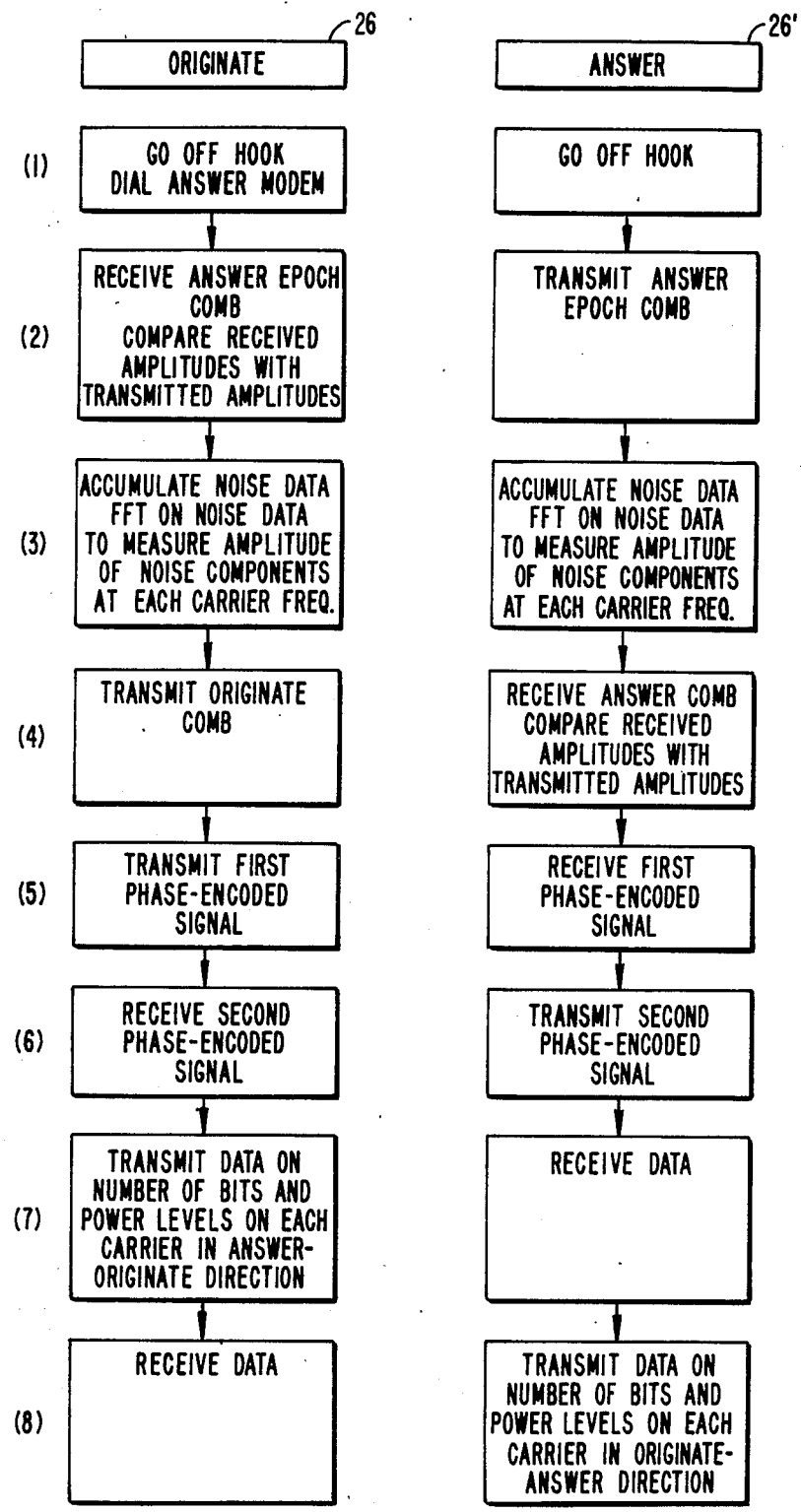
FIG._4.

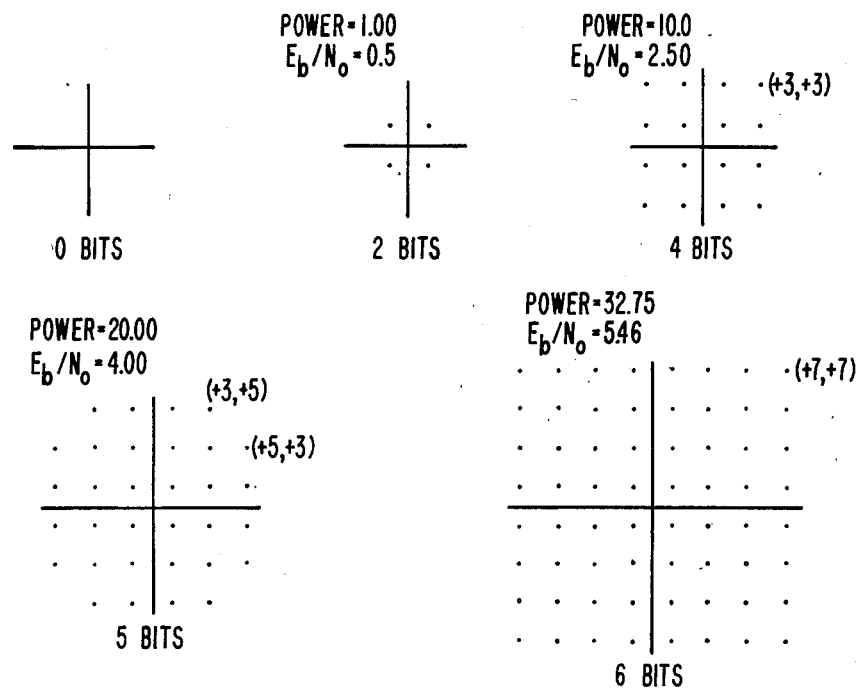
FIG._5.
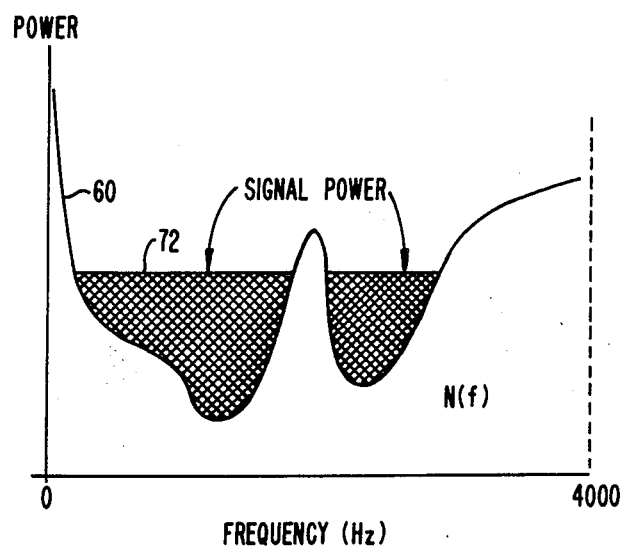
FIG._6.

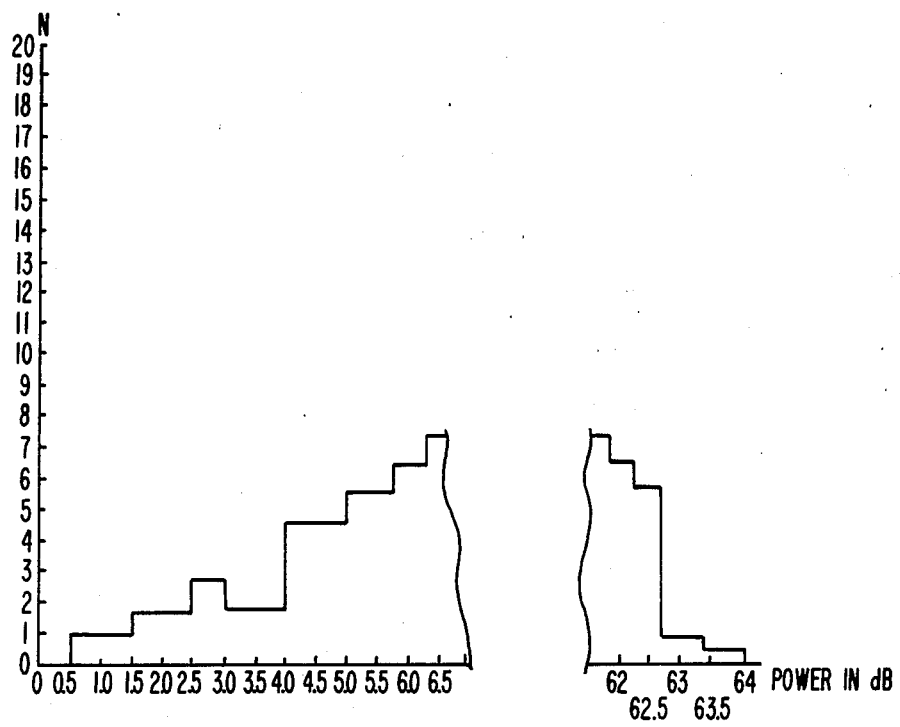
FIG._7.
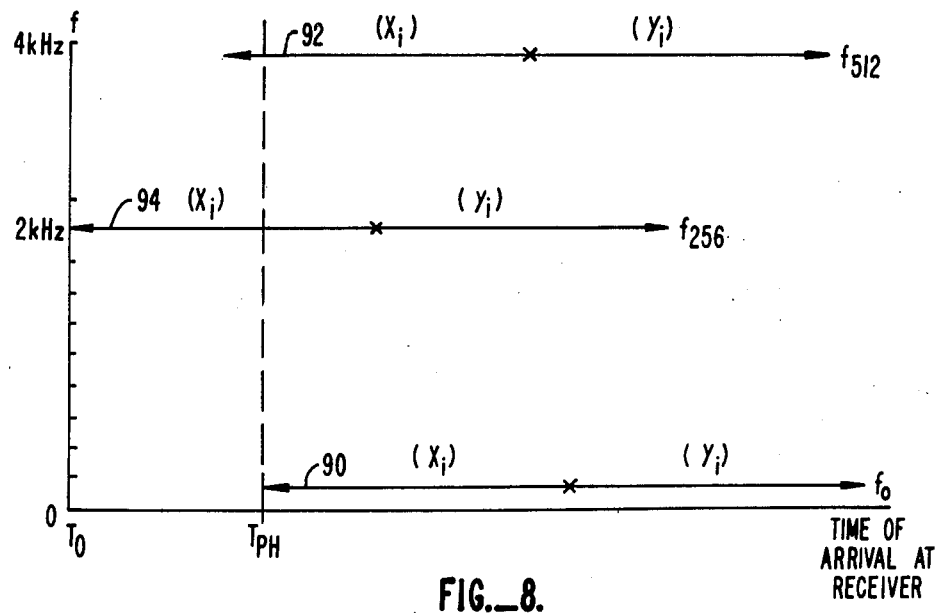
FIG._8.

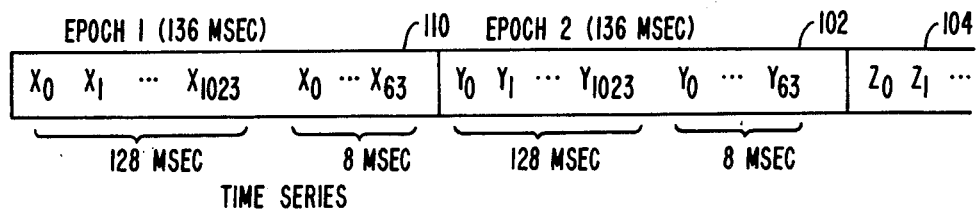
FIG._9.
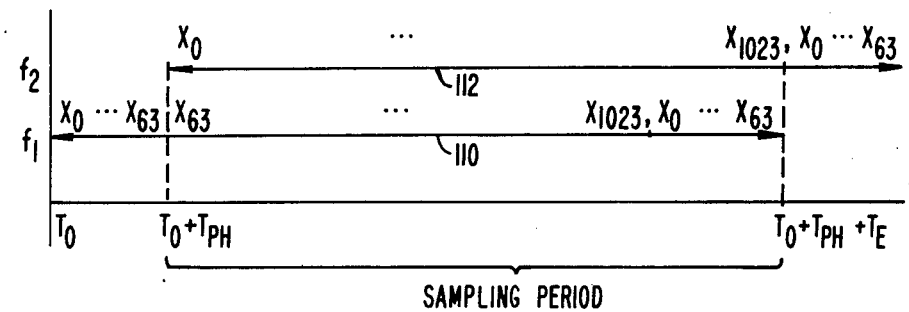
FIG._10.
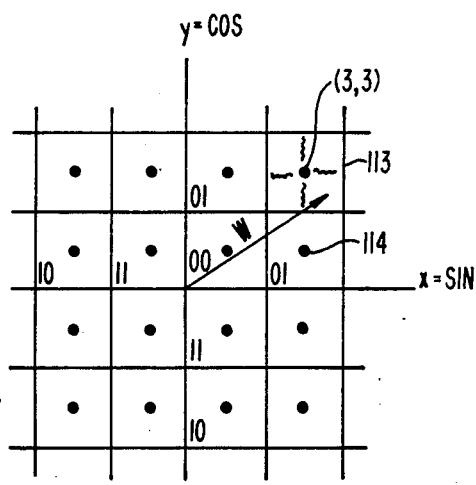
FIG._11.

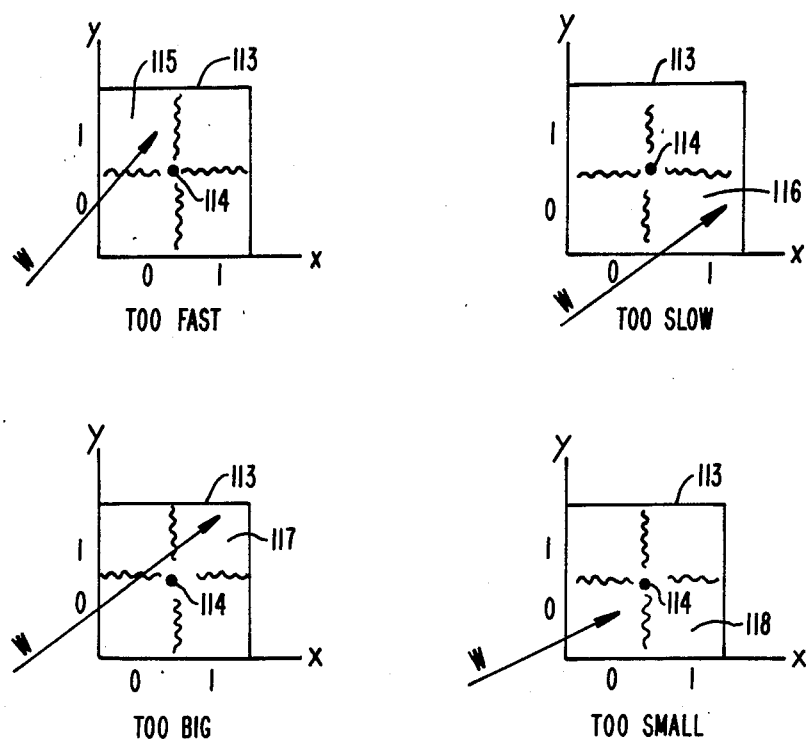
FIG._12.
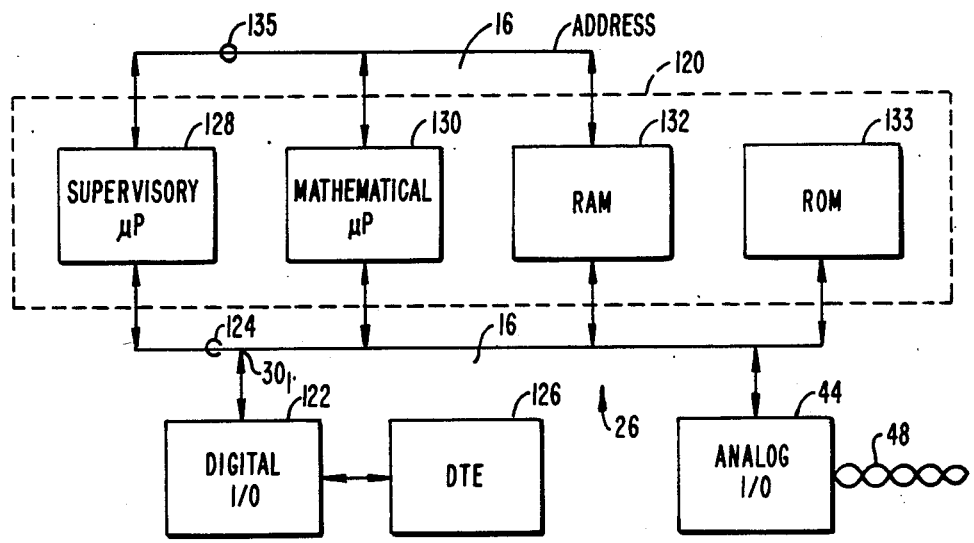
FIG._13.

ENSEMBLE MODEM STRUCTURE FOR IMPERFECT TRANSMISSION MEDIA

BACKGROUND OF THE INVENTION

1. Field of the Invention:

The invention relates generally to the field of data communications and, more particularly, to a high speed modem.

2. Description of the Prior Art:

Recently, specially designed telephone lines for the direct transmission of digital data have been introduced. However, the vast majority of telephone lines are designed to carry analog voice frequency (VF) signals. Modems are utilized to modulate VF carrier signals to encode digital information on the VF carrier signals and to demodulate the signals to decode the digital information carried by the signal.

Existing VF telephone lines have several limitations that degrade the performance of modems and limit the rate at which data can be transmitted below desired error rates. These limitations include the presence of frequency dependent noise on the VF telephone lines, a frequency dependent phase delay induced by the VF telephone lines, and frequency dependent signal loss.

Generally, the usable band of a VF telephone line is from slightly above zero to about four kHz. The power spectrum of the line noise is not uniformly distributed over frequency and is generally not determinative. Thus, there is no a priori method for determining the distribution of the noise spectrum over the usable bandwidth of the VF line.

Additionally, a frequency-dependent propagation delay is induced by the VF telephone line. Thus, for a complex multi-frequency signal, a phase delay between the various components of the signal will be induced by the VF telephone line. Again, this phase delay is not determinative and must be measured for an individual VF telephone line at the specific time that transmission takes place.

Further, the signal loss over the VF telephone line varies with frequency. The equivalent noise is the noise spectrum component added to the signal loss component for each carrier frequency, where both components are measured in decibels (dB).

Generally, prior art modems compensate for equivalent line noise and signal loss by gear-shifting the data rate down to achieve a satisfactory error rate. For example, in U.S. Pat. No. 4,438,511, by Baran, a high speed modem designated SM9600 Super Modem manufactured by Gandalf Data, Inc., is described. In the presence of noise impairment, the SM9600 will "gear shift" or drop back its transmitted data rate to 4800 bps or 2400 bps. The system described in the Baran patent transmits data over 64 orthogonally modulated carriers. The Baran system compensates for the frequency dependent nature of the noise on the VF line by terminating transmission on carriers having the same frequency as the frequency of large noise components on the line. Thus, Baran gracefully degrades its throughput by ceasing to transmit on carrier frequencies at the highest points of the VF line noise spectrum. The Baran system essentially makes a go/no go decision for each carrier signal, depending on the distribution of the VF line noise spectrum. This application reflects a continuation of the effort initiated by Baran.

Most prior art systems compensate for frequency dependent phase delay induced by the VF line by an equalization system. The largest phase delay is induced in frequency components near the edges of the usable band. Accordingly, the frequency components near the center of the band are delayed to allow the frequency components at the outside of the band to catch up. Equalization generally requires additional circuitry to accomplish the above-described delays.

A further problem associated with two way transmission over the VF telephone line is that interference between the outgoing and incoming signals is possible. Generally, separation and isolation between the two signals is achieved in one of three ways:

(a) Frequency multiplexing in which different frequencies are used for the different signals. This method is common in modem-based telecommunication systems.

(b) Time multiplexing, in which different time segments are used for the different signals. This method is often used in half-duplex systems in which a transmitter relinquishes a channel only after sending all the data it has. And, (c) Code multiplexing, in which the signals are sent using orthogonal codes.

All of the above-described systems divide the space available according to constant proportions fixed during the initial system design. These constant proportions, however, may not be suitable to actual traffic load problem presented to each modem. For example, a clerk at a PC work station connected to a remote host computer may type ten or twenty characters and receive a full screen in return. In this case, constant proportions allocating the channel equally between the send and receive modems would greatly overallocate the channel to the PC work station clerk. Accordingly, a modem that allocates channel capacity according to the needs of the actual traffic load situation would greatly increase the efficient utilization of the channel capacity.

SUMMARY OF THE INVENTION

The present invention is a high-speed modem for use with dial-up VF telephone lines. The modem utilizes a multicarrier modulation scheme and variably allocates data and power to the various carriers to maximize the overall data transmission rate. The allocation of power among the carriers is subject to the constraint that the total power allocated must not exceed a specified limit.

In a preferred embodiment, the modem further includes a variable allocation system for sharing control of a communication link between two modems (A and B) according to actual user requirements.

Another aspect of the invention is a system for compensating for frequency dependent phase delay and preventing intersymbol interference that does not require an equalization network.

According to one aspect of the invention, quadrature amplitude modulation (QAM) is utilized to encode data elements of varying complexity on each carrier. The equivalent noise component at each carrier frequency is measured over a communication link between two modems (A and B).

As is known in the art, if the bit error rate (BER) is to be maintained below a specified level, then the power required to transmit a data element of a given complexity on a given carrier frequency must be increased if the equivalent noise component at that frequency increases.

Equivalently, to increase data complexity, the signal to noise ratio, S/N, must be increased.

In one embodiment of the present invention, data and power are allocated to maximize the overall data rate within external BER and total available power constraints. The power allocation system computes the marginal required power to increase the symbol rate on each carrier from n to n+1 information units. The system then allocates information units to the carrier that requires the least additional power to increase its symbol rate by one information unit. Because the marginal powers are dependent on the values of the equivalent noise spectrum of the particular established transmission link, the allocation of power and data is specifically tailored to compensate for noise over this particular link.

According to another aspect of the invention, a first section of the symbol on each carrier is retransmitted to form a guard-time waveform of duration $T_E+T_{PH}$ where $T_E$ is the duration of the symbol and $T_{PH}$ is the duration of the first section. The magnitude of $T_{PH}$ is greater than or equal to the maximum estimated phase delay for any frequency component of the waveform. For example, if the symbol is represented by the time series, $x_0 \ldots x_{n-1}$, transmitted in time $T_E$, then the guardtime waveform is represented by the time series, $x_0 \ldots x_{n-1}, x_0 \ldots x_{m-1}$, transmitted in time $T_E+T_{PH}$. The ratio that m bears to n is equal to the ratio that $T_{PH}$ bears to $T_E$.

At the receiving modem, the time of arrival, $T_O$, of the first frequency component of the guard-time waveform is determined. A sampling period, of duration $T_E$, is initiated a time $T_O+T_{PH}$.

Accordingly, the entire symbol on each carrier frequency is sampled and intersymbol interference is eliminated.

According to a still further aspect of the invention, allocation of control to the transmission link between modems A and B is accomplished by setting limits to the number of packets that each modem may transmit during one transmission cycle. A packet of information comprises the data encoded on the ensemble of carriers comprising one waveform. Each modem is also constrained to transmit a minimum number of packets to maintain the communication link between the modems. Thus, even if one modem has no data to transmit, the minimum packets maintain timing and other parameters are transmitted. On the other hand, if the volume of data for a modem is large, it is constrained to transmit only the maximum limited number of packets, N, before relinquishing control to the other modem.

In practice, if modem A has a small volume of data and modem B has a large volume of data, modem B will have control of the transmission link most of the time. If control is first allocated to modem A it will only transmit the minimal number, I, of packets. Thus A has control for only a short time. Control is then allocated to B which transmits N packets, where N may be very large. Control is again allocated to modem A which transmits I packets before returning control to B.

Thus, allocation of control is proportional to the ratio of I to N. If the transmission of the volume of data on modem A requires L packets, where L is between I and N, then the allocation is proportional to the ratio of L to N. Accordingly, allocation of the transmission link varies according to the actual needs of the user.

Additionally, the maximum number of packets, N, need not be the same for each modem, but may be varied to accommodate known disproportions in the data to be transmitted by A and B modems.

According to another aspect of the invention, signal loss and frequency offset are measured prior to data determination. A tracking system determines variations from the measured values and compensates for these deviations.

According to a further aspect of the invention, a system for determining a precise value of $T_O$ is included. This system utilizes two timing signals, at $f_1$ and $f_2$, incorporated in a waveform transmitted from modem A at time $T_A$. The relative phase difference between the first and second timing signals at time $T_A$ is zero.

The waveform is received at modem B and a rough estimate, $T_{EST}$, of the time of reception is obtained by detecting energy at $f_1$. The relative phase difference between the timing signals at time $T_{EST}$ is utilized to obtain a precise timing reference, $T_O$.

BRIEF DESCRIPTION OF THE DRAWINGS

FIG. 1 is a graph of the ensemble of carrier frequencies utilized in the present invention.

FIG. 2 is a graph of the constellation illustrating the QAM of each carrier.

FIG. 3 is a block diagram of an embodiment of the invention.

FIG. 4 is a flow chart illustrating the synchronization process of the present invention.

FIG. 5 is a series of graphs depicting the constellations for 0, 2, 4, 5, 6 bit data elements and exemplary signal to noise ratios and power levels for each constellating FIG. 6 is a graph illustrating the waterfilling algorithm.

FIG. 7 is a histogram illustrating the application of the waterfilling algorithm utilized in the present invention.

FIG. 8 is a graph depicting the effects of phase dependent frequency delay on frequency components in the ensemble.

FIG. 9 is a graph depicting the wave forms utilized in the present invention to prevent intersymbol interference FIG. 10 is a graph depicting the method of receiving the traasmitted ensemble.

FIG. 11 is a schematic diagram depicting the modulation template.

FIG. 12 is a schematic diagram depicting the quadrants of one sare in the modulation template.

FIG. 13 is a schematic diagram of a hardware embodiment of the present invention.

DETAILED DESCRIPTION OF THE PREFERRED EMBODIMENTS

The present invention is a modem that adaptively allocates power between various carrier frequencies in a frequency ensemble to compensate for frequency dependent line noise, eliminates the need for equalization circuitry to compensate for a frequency dependent phase delay, and provides a duplex mechanism that accounts for varying channel load conditions to allocate the channel between the send and receive modems. Additional features of the invention are described below.

A brief description of the frequency ensemble and modulation scheme utilized in the present invention is first presented with respect to FIGS. 1 and 2 to facilitate the understanding of the invention. A specific embodiment of the invention is then described with reference to FIG. 3. Finally, the operation of various features of the invention are described with reference to FIGS. 4 through 13.

Modulation and Ensemble Configuration

Referring now to FIG. 1, a diagrammatic representation is shown of the transmit ensemble 10 of the present invention. The ensemble includes 512 carrier frequencies 12 equally spaced across the available 4 kHz VF band. The present invention utilizes quadrature amplitude modulation (QAM) wherein phase independent sine and cosine signals at each carrier frequency are transmitted. The digital information transmitted at a given carrier frequency is encoded by amplitude modulating the independent sine and cosine signals at that frequency.

The QAM system transmits data at an overall bit rate, $R_B$. However, the transmission rate on each carrier, denoted the symbol or baud rate, $R_S$, is only a fraction of $R_B$. For example, if data were allocated equally between two carriers then $R_S = R_B/2$ In the preferred embodiment 0, 2, 4, 5 or 6 bit data elements are encoded on each carrier and the modulation of each carrier is changed every 136 msec. A theoretical maximum, $R_B$, assuming a 6 bit $R_S$ for each carrier, of 22,580 bit/sec (bps) results. A typical realizable $R_S$, assuming 4 bit $R_S$ over 75% of the carriers, is equal to about 11,300 bps. This extremely high $R_S$ is achieved with a bit error rate of less than 1 error/100,000 bits transmitted.

In FIG. 1, a plurality of vertical lines 14 separates each ensemble into time increments known hereafter as "epochs." The epoch is of duration $T_E$ where the magnitude of $T_E$ is determined as set forth below.

The QAM system for encoding digital data onto the various carrier frequencies will now be described with reference to FIG. 2. In FIG. 2 a four bit "constellation" 20 for the nth carrier is depicted. A four bit number may assume sixteen discrete values. Each point in the constellation represents a vector $(x_n, y_n)$ with $x_n$ being the amplitude of the sine signal and $y_n$ being the amplitude of the cosine signal in the abovedescribed QAM system. The subscript n indicates the carrier being modulated. Accordingly, the four bit constellation requires four discrete $y_n$ and four discrete $x_n$ values. As described more fully below, increased power is required to increase the number of bits transmitted at a given carrier frequency due to the equivalent noise component at that frequency. The receive modem, in the case of four bit transmission, must be able to discriminate between four possible values of the $x_n$ and $y_n$ amplitude coefficients. This ability to discriminate is dependent on the signal to noise ratio for a given carrier frequency.

In a preferred embodiment, packet technology is utilized to reduce the error rate. A packet includes the modulated epoch of carriers and error detection data. Each packet in error is retransmitted until correct. Alternatively, in systems where retransmission of data is undesirable, epochs with forward error correcting codes may be utilized.

Block Diagram

FIG. 3 is a block diagram of an embodiment of the present invention. The description that follows is of an originate modem 26 coupled to an originate end of a communication link formed over a public switched telephone line. It is understood that a communication system also includes an answer modem coupled to the answer end of the communication link. In the following discussion, parts in the answer modem corresponding to identical or similar parts in the originate modem will be designated by the reference number of the originate modem primed.

Referring now to FIG. 3, an incoming data stream is received by a send system 28 of the modem 26 at data input 30. The data is stored as a sequence of data bits in a buffer memory 32. The output of buffer memory 32 is coupled to the input of a modulation parameter generator 34. The output of the modulation parameter generator 34 is coupled to a vector table buffer memory 36 with the vector table buffer memory 36 also coupled to the input of a modulator 40. The output of the modulator 40 is coupled to a time sequence buffer 42 with the time sequence buffer 42 also coupled to the input of a digital-to-analog converter 43 included in an analog I/0 interface 44. The interface 44 couples the output of the modem to the public switched telephone lines 48.

A receive system 50 includes an analog-to-digital converter (ADC) 52 coupled to the public switched telephone line 48 and included in the interface 44. The output from the ADC 52 is coupled to a receive time series buffer 54 which is also coupled to the input of a demodulator 56. The output of the demodulator 56 is coupled to a receive vector table buffer 58 which is also coupled to the input of a digital data generator 60. The digital data generator 60 has an output coupled to a receive data bit buffer 62 which is also coupled to an output terminal 64.

A control and scheduling unit 66 is coupled with the modulation parameter generator 34, the vector table buffer 36, the demodulator 56, and the receive vector table buffer 58.

An overview of the functioning of the embodiment depicted in FIG. 3 will now be presented. Prior to the transmission of data, the originate modem 26, in cooperation with the answer modem 26', measures the equivalent noise level at each carrier frequency, determines the number of bits per epoch to be transmitted on each carrier frequency, and allocates power to each carrier frequency as described more fully below.

The incoming data is received at input port 30 and formatted into a bit sequence stored in the input buffer 32.

The modulator 34 encodes a given number of bits into an $(x_n, y_n)$ vector for each carrier frequency utilizing the QAM system described above. For example, if it were determined that four bits were to be transmitted at frequency $f_n$ then four bits from the bit stream would be converted to one of the sixteen points in the four bit constellation of FIG. 2. Each of these constellation points corresponds to one of sixteen possible combinations of four bits. The amplitudes of the sine and cosine signals for frequency n then corresponds to the point in the constellation encoding the four bits of the bit sequence. The $(x_n, y_n)$ vectors are then stored in the vector buffer table 36. The modulator receives the table of $(x_n, y_n)$ vectors for the carriers in the ensemble and generates a digitally encoded time series representing a wave form comprising the ensemble of QAM carrier frequencies.

In a preferred embodiment the modulator 40 includes a fast Fourier transform (FFT) and performs an inverse FFT operation utilizing the (x,y) vectors as the FFT coefficients. The vector table includes 1,024 independent points representing the 1,024 FFT points of the 512 frequency constellation. The inverse FFT operation generates 1,024 points in a time series representing the QAM ensemble. The 1,024 elements of this digitally encoded time series are stored in the digital time series buffer 42. The digital time sequence is converted to an analog wave form by the analog to digital converter 43 and the interface 46 conditions the signal for transmission over the public switched telephone lines 48.

Turning now to the receive system 50, the received analog waveform from the public switched telephone lines 48 is conditioned by the interface 46 and directed to the analog to digital converter 52. The analog to digital converter 52 converts the analog waveform to a digital 1,024 entry time series table which is stored in the receive time series buffer 54. The demodulator 56 converts the 1,024 entry time series table into a 512 entry $(x_n, y_n)$ vector table stored in the receive vector table buffer 58. This conversion is accomplished by performing an FFT on the time series. Note that information regarding the number of bits encoded onto each frequency carrier has been previously stored in the demodulator and digital data generator 60 so that the $(x,y)$ table stored in the receive vector table buffer 58 may be transformed to an output data bit sequence by the digital data generator 60. For example, if the $(x_n, y_n)$ vector represents a four bit sequence then this vector would be converted to a four bit sequence and stored in the receive data bit buffer 62 by the digital data generator 60. The receive data bit sequence is then directed to the output 64 as an output data stream.

A full description of the FFT techniques utilized is described in a book by Rabiner et al., entitled *Theory and Applications of Digital Signal Processing*, Prentice-Hall, Inc., N.J., 1975. However, the FFT modulation technique described above is not an integral part of the present invention. Alternatively, modulation could be accomplished by direct multipication of the carrier tones as described in the above-referenced Baran patent, which is hereby incorporated by reference, at col. 10, lines 13–70, and col. 11, lines 1–30. Additionally, the demodulation system described in Baran at col. 12, lines 35–70, col. 13, lines 1–70, and col. 14, lines 1–13 could be substituted.

The control and scheduling unit 66 maintains overall supervision of the sequence of operations and controls input and output functions.

Determination of Equivalent Noise

As described above, the information content of the data element encoded on each frequency carrier and the power allocated to that frequency carrier depends on the magnitude of the channel noise component at that carrier frequency. The equivalent transmitted noise component at frequency $f_n$, $N(f_n)$, is the measured (received) noise power at frequency $f_n$ multiplied by the measured signal loss at frequency $f_n$. The equivalent noise varies from line to line and also varies on a given line at different times. Accordingly, in the present system, N(f) is measured immediately prior to data transmission.

The steps of a synchronization technique utilized in the present system to measure N(f) and establish a transmission link between answer and originate modems 26 and 26' are illustrated in FIG. 4. Referring now to FIG. 4, in step 1 the originate modem dials the number of the answer modem and the answer modem goes off hook.

In step 2 the answer modem transmits an epoch of two frequencies at the following power levels:
 (a) 1437.5 Hz. at −3 dBR; and
 (b) 1687.5 Hz at −3 dBR.
The power is measured relative to a reference, R, where, in a preferred embodiment, 0 dBR = −9 dBm, m being a millivolt. These tones are used to determine timing and frequency offset as detailed subsequently.

The answer modem then transmits an answer comb containing all 512 frequencies at −27 dBR. The originate modem receives the answer comb and performs an FFT on the comb. Since the power levels of the 512 frequencies were set at specified values, the control and scheduling unit 66 answer modem 26 compares the $(x_n, y_n)$ values for each frequency of the received code and compares those values to a table of $(x_n, y_n)$ values representing the power levels of the transmitted answer code. This comparison yieds the signal loss at each frequency due to the transmission over the VF telephone lines.

During step 3 both the originate and answer modems 26 and 26' accumulate noise data present on the line in the absence of any transmission by either modem. Both modems then perform an FFT on the accumulated noise signals to determine the measured (received) noise spectrum component values at each carrier frequency. Several epochs of noise may be averaged to refine the measurement.

In step 4 the originate modem transmits an epoch of two frequencies followed by an originate comb of 512 frequencies with the same power levels described above for step 2. The answer modem receives the epoch and the originate comb and calculates the timing, frequency offset and signal loss values at each carrier frequency as described above for the originate modem in step 2. At this point the originate modem 26 has accumulated noise and signal loss data for transmission in the answer originate direction while the answer modem has accumulated the same data relating to transmission in the originate answer direction. Each modem requires data relating to transmission loss and receive noise in both the originate-answer and answer-originate directions. Therefore, this data is exchanged between the two modems according to the remaining steps of the synchronization process.

In step 5 the originate modem generates and transmits a first phase encoded signal indicating which carrier frequencies will support two bit transmission at standard power levels in the answer-originate direcion. Each component that *will* support two bits in the answer-originate direction at a standard power level is generated as a −28 dBR signal with 180° relative phase. Each component that *will not* support two bit transmission in the answer-originate direction at the standard power level is coded as a −28 dBR, 0° relative phase signal. The answer modem receives this signal and determines which frequency carriers will support two bit transmission in the answer-originate direction.

In step 6 the answer modem generates and transmits a second phase encoded signal indicating which carrier frequencies will support two bit transmission in both the originate-answer and answer-originate directions. The generation of this signal is possible because the answer modem has accumulated noise and signal loss data in the originate-answer direction and has received the same data for the answer-originate direction in the signal generated by the originate modem in step 5. In the signal generated by the originate modem, each frequency component that *will* support two bits in *both* directions is coded with 180° relative phase and all other components are coded with 0° relative phase.

A transmission link now exists between the two modems. In general, 300 to 400 frequency components will support two bit transmission at a standard power level, thereby establishing about a 600 bit/epoch rate between the two modems. In step 7 the originate modem sends data on the number of bits (0 to 15) and the power levels (0 to 63 dB) that can be supported on each frequency in the answer-originate direction in ensemble packets formed over this existing data link. Accordingly, both the originate and answer modem now have the data relating to transmission in the answer-originate direction. The steps for calculating the number of bits and power levels that can be supported on each frequency component will be described below.

In step 8 the answer modem sends data on the number of bits and power levels that can be supported on each frequency in the originate-answer direction utilizing the existing data link. Thus, both modems are apprised of the number of bits and power levels to be supported on each frequency component in both the answer-originate and originate-answer directions.

The above description of the determination of the equivalent noise level component at each carrier frequency sets forth the required steps in a given sequence. However, the sequence of steps is not critical and many of the steps may be done simultaneously or in different order, for example, the performance of the FFT on the originate code and the accumulation of noise data may be done simultaneously. A precise timing reference is also calculated during the synchronization process. The calculation of this timing reference will be described more fully below after the description of the method for calculating the number of bits and power levels allocated to each frequency component.

It is a common VF telephone line impairment that a frequency offset, of up to 7 Hz, exists between transmitted and received signals. This offset must be corrected for the FFT to function reliably. In a preferred embodiment, this correction is achieved by performing a single sideband modulation of the quadrature tones at the offset frequency by the true and Hilbert images of received signal. Synchronization and tracking algorithms generate estimates of the frequency offset necessary.

Power and Code Complexity Allocation

The information encoded on each carrier frequency signal is decoded at the receiver channel by the demodulator 56. Channe noise distorts the transmitted signal and degrades the accuracy of the demodulation process. The transmission of a data element having a specified complexity, e.g., $B_O$ bits at a specified frequency, $f_O$, over a VF telephone line characterized by an equivalent noise level component, $N_O$, will now be analyzed. Generally, external system requirements determine a maximum bit error rate (BER) that can be tolerated. For the transmission of $b_O$ bits at noise level $N_O$ and frequency $f_O$, the signal to noise ratio must exceed $E_b/N_O$ where $E_b$ is the signal power per bit to maintain the BER below a given BER, $(BER)_O$.

FIG. 5 depicts the QAM constelations for signals of various complexities B. An exemplary signal to noise ratio, $E_b/N_O$, for each constellation and the power required to transmit the number of bits in the constellation without exceeding $(BER)_O$ is depicted alongside each constellation graph.

A modem operates under the constraint that the total available power placed on the public switched telephone lines may not exceed a value, $P_O$, set by the telephone companies and government agencies. Thus, signal power may not be increased indefinitely to compensate for line noise. Accordingly, as noise increases, the complexity of the signals transmitted must be decreased to maintain the required BER.

Most existing modems arbitrarily gear shift the signal complexity down as line noise power increases. For example, one prior art modem reduces the transmitted data rate from a maximum of 9,600 bps to steps of 7,200 bps, 4,800 bps, 2,400 bps, 1,200 bps, and so on until the bit error rate is reduced below a specified maximum. Accordingly, the signal rate is decreased in large steps to compensate for noise. In the Baran patent, the method for reducing the transmission rate takes into account the frequency dependent nature of the noise spectrum. There, each channel carries a preset number of bits at a specified power level. The noise component at each frequency is measured and a decision is made whether to transmit at each carrier frequency. Thus, in Baran, the data rate reduction scheme compensates for the actual distribution of the noise over the available bandwidth.

In the present invention, the complexity of the signal on each frequency carrier and the amount of the available power allocated to each frequency carrier is varied in response to the frequency dependence of the line noise spectrum.

The present system for assigning various code complexities and power levels to the frequency component signals in the ensemble is based on the waterfilling algorithm. The waterfilling algorithm is an information theoretic way of assigning power to a channel to maximize the flow of information across the channel. The channel is of the type characterized by an uneven noise distribution and the transmitter is subject to a power constraint. FIG. 6 provides a visualization of the waterfilling algorithm. Referring now to FIG. 6, power is measured along the vertical axis and frequency is measured along the horizontal axis. The equivalent noise spectrum is represented by the solid line 70 and the available power is represented by the area of the cross hatched region 72. The name waterfilling comes from the analogy of the equivalent noise function to a series of valleys in a mountain filled with a volume of water representing the assigned power. The water fills the valleys and assumes a level surface. A theoretical description of the waterfilling algorithm is given in the book by Gallagher, entitled *Information Theory And Reliable Communication;* J. Wiley and Sons, N.Y. 1968, p. 387.

It must be emphasized that the waterfilling theorem relates to maximizing the theoretical capacity of a channel where the capacity is defined as the maximum of all data rates achievable using different codes, all of which are error correcting, and where the best tend to be of infinite length.

The method utilizing the present invention does not maximize the capacity of the channel. Instead, the method maximizes the amount of information transmitted utilizing the QAM ensemble described above with respect to FIG. 1 and subject to an available power restriction.

An implementation of the waterfilling concept is to allocate an increment of available power to the carrier having the lowest equivalent noise floor until the allocatd power level reaches the equivalent noise level of the second lowest carrier. This allocation requires a scan through the 512 frequencies.

Incremental power is then allocated between the lowest two carriers until the equivalent noise level of the third lowest channel is reached. This allocation level requires many scans through the frequency table and is computationally complex.

The power allocation method used in a preferred embodiment of the present invention is as follows:

(1) Calculate the system noise at the transmitter by measuring the equivalent noise at the receiver and multiplying by transmission loss. This process for measuring these quantities was described above with respect to synchronization and FIG. 4. The system noise components are calculated for each carrier frequency.

(2) For each carrier frequency, calculate the power levels required to transmit data elements of varying complexity (in the present case, 0, 2, 4, 5, 6, and 8 bits). This is accomplished by multiplying the equivalent noise by the signal to noise ratios necessary for transmission of the various data elements with a required BER, for example one error per 100,000 bits. The overall BER is the sum of the signal error rates of each modulated carrier. These signal to noise ratios are available from standard references, and are well-known in the art.

(3) From the calculated required transmission power levels, the marginal required power levels to increase data element complexity are determined. These marginal required power levels are the difference in transmission power divided by the quantitative difference in complexity of the data elements closest in complexity.

(4) For each channel generate a two column table of marginal required power levels and quantitative differences where the units are typically expressed as Watts and bits, respectively.

(5) Construct a histogram by organizing the table of step 4 according to increasing marginal power.

(6) Assign the available transmitter power sequentially over the increasing marginal powers until available power is exhausted.

The power allocation method may be better understood through a simple example. The numbers presented in the example are not intended to represent parameters encountered in an operating system. Table 1 sets out the power requirement, P, to transmit a data element of a selected number of bits, $N_1$, for two carriers A and B at frequencies $f_A$ and $f_B$.

TABLE 1

| $N_1$ | $N_2 - N_1$ | P | $MP(N_1 \text{ to } N_2)$ |
|---|---|---|---|
| | | Carrier A | |
| 0 | — | 0 | — |
| 2 | 2 | 4 | MP(0 to 2) = 2/bit |
| 4 | 2 | 12 | MP(2 to 4) = 4/bit |
| 5 | 1 | 19 | MP(4 to 5) = 7/bit |
| 6 | 1 | 29 | MP(5 to 6) = 10/bit |
| | | Carrier B | |
| 0 | — | 0 | — |
| 2 | 2 | 6 | MP(0 to 2) = 3/bit |
| 4 | 2 | 18 | MP(2 to 4) = 6/bit |
| 5 | 1 | 29 | MP(4 to 5) = 11/bit |
| 6 | 1 | 44 | MP(5 to 6) = 15/bit |

The marginal power to increase the complexity from a first number of bits, $N_1$, to a second number of bits, $N_2$, is defined by the relationship:

$$MP(N_1 \text{ to } N_2) = \frac{P_2 - P_1}{N_2 - N_1}$$

where $P_2$ and $P_1$ are the powers required to transmit data elements of complexity $N_2$ and $N_1$. $N_2-N_1$ is quantitative difference in the complexity of the data elements. It is understood the BER is constrained to remain below a preset limit.

The marginal powers for $f_A$ are less than for $f_B$ because the equivalent noise at $f_B$, $N(f_B)$, is greater than the equivalent noise at $f_A$, $N(f_A)$.

The implementation of the allocation scheme for carriers A and B will now be described. Assume that a total number of bits, $N_T$, are encoded on the ensemble but that no bits have been assigned to carriers A or B. For example, $N(f_A)$ and $N(f_A)$ might be greater than the powers of those carriers already carrying the data.

In this example, the system is to allocate ten remaining available power units between carriers A and B to increase the overall data element complexity by the maximum amount.

To increase $N_T$ by two bits requires that four units of power be allocated if channel A is utilized and that six units of power be allocated in channel B is utilized. This follows because for both channels $N_1=0$ and $N_2=2$ and MP(0 to 2)=2/bit for channel A and MP(0 to 2)=3/bit for channel B. Therefore, the system allocates four units of power to carrier A, encodes a two bit data element on carrier A, increases the overall signal complexity from $N_T$ to $N_T+2$, and has six remaining available power units.

The next increase of two bits requires six power units because MP(2 to 4)=4/bit for carrier A and MP(0 to 2)=3/bit for channel B. Therefore, the system allocates six units of power to carrier B, encodes a two bit data element on carrier B, increases the overall signal complexity from $N_T+2$ to $N_T+4$ bits, and has no remaining available power units.

As is now clear, the system "shops" among the various carrier frequencies for the lowest power cost to increase the complexity of the overall ensemble data element.

The allocation system is extended to the full 512 carrier ensemble by first generating the tables of Table 1 for each carrier during a first pass through the frequencies.

A histogram organizing the calculated marginal required power levels for all the carriers according to increasing power is then constructed. FIG. 7 is a depiction of an exemplary histogram constructed according to the present method.

In FIG. 7 the entire table of marginal powers is not displayed. Instead, the histogram is constructed having a range of 64 dB with counts spaced in 0.5 dB steps. The quantitative differences between the steps are utilized as counts. Although this approach results in a slight round-off error, a significant reduction in task length is achieved. The method used to construct the histogram is not critical to practicing the invention.

Each count of the histogram has an integer entry representing the number of carriers having a marginal power value equal to the power value at the count. The histogram is scanned from the lowest power level. The integer entry at each count is multiplied by the number of counts and subtracted from the available power. The scan continues until available power is exhausted.

When the scan is completed it has been determined that all marginal power values below a given level, MP(max), are acceptable for power and data allocation. Additionally, if available power is exhausted partially through marginal power level, MP(max), then k additional carriers will be allocated power equal to MP(max+1).

The system then scans through the ensemble again to allocate power and data to the various carriers. The amount of power allocated to each carrier is the sum of marginal power values for that carrier less than or equal to MP(max). Additionally, an amount of power equal to MP(max+1) will be allocated if the k MP(max+1) values have not been previously allocated.

Timing and Phase Delay Compensation

The reconstruction of (x,y) vector table by the receive system requires 1024 time samples of the received waveform. The bandwidth is about 4 kHz so that Nyquist sampling rate about 8000/sec and the time sample offset between samples is 125 microseconds. The total sampling time is thus 128 msec. Similarly, the transmit FFT generates a time series having 1024 entries and the symbol time is 128 msec.

The sampling process requires a timing reference to initiate the sampling. This timing reference is established during synchronization by the following method:

During the synchronization steps defined with reference to FIG. 4, the originate modem detects energy at the 1437.5 Hz frequency component (the first timing signal) in the answer comb at time $T_{EST}$. This time is a rough measure of the precise time that the first timing frequency component arrives at the receiver and is generally accurate to about 2 msec.

This rough measure is refined by the following steps. The first timing signal and a second timing signal (at 1687.5 Hz) are transmitted with zero relative phase at the epoch mark.

The originate modem compares the phases of the first and second timing signals at tim $T_{EST}$. The 250 Hz frequency difference between the first and second timing signals results in an 11° phase shift between the two signals for each 125 microsecond time sample offset. The first and second timing signals have low relative phase distortion (less than 250 microseconds) due to their location near the center of the band. Accordingly, by comparing the phases of the two timing samples and correctin $T_{EST}$ by the number of time sampling offsets indicated by the phase difference, a precise timing reference, $T_0$, can be determined.

A further difficulty relating to timing the sampling process relates to frequency dependent phase delay induced by the VF line. This phase delay typically is on the order of 2 msec, or more, for VF telephone lines. Further, this phase delay is significantly worse near the edges of the 4 kHz usable band.

FIG. 8 depicts distribution of the frequency carriers of the ensemble after undergoing frequency dependent phase delay. Referring to FIG. 8, three signals 90, 92, and 94 at frequencies $f_0$, $f_{256}$, and $f_{512}$ are depicted. Two symbols $x_i$ and $y_i$, of length $T_S$ are transmitted at eaoh frequenoy. Note that the duration of each symbol is not changed. However, the leading edge of the signals near the edge of the band 92 and 94 are delayed relative to those signals near the center of the band 94.

Additionally, for two sequentially transmitted epochs $x_i$ and $y_i$ the trailing section of the first symbol $x_i$ on signals 92 and 96, near the outer edge of the band will overlap the leading edge of the second symbol $y_i$ on the signal 94 near the center of the band. This overlap results in intersymbol interference.

If the sampling interval is framed to sample a given time interval, $T_S$, then complete samples of every carrier in the ensemble will not be obtained and signals from other epochs will also be sampled.

Existing systems utilize phase correction (equalization) networks to correct for phase distortion and to prevent intersymbol interference.

The present invention utilizes a unique guard-time format to eliminate the need for an equalization network. This format is illustrated in FIG. 9.

Referring now to FIG. 9, first, second, and third transmitted symbols, represented by time series $x_i$, $y_i$, and $z_i$, respectively, are depicted. The waveforms depicted in FIG. 3 are modulated on one of the carriers at frequency f. In this example a symbol time, $T_S$, of 128 msec. and a maximum phase delay, $T_{PH}$, of 8 msec are assumed. A guard-time waveform is formed by repeating the first 8 msec. of the symbol. The guard-time waveform defines an epoch of 136 msec. For example, in the first waveform 110, $(X_i)$, the time series of the symbol, $X_0$–$X_{1023}$, is first transmitted, then the first 8 msec. of the symbol, $X_0$–$X_{63}$, are repeated.

The sampling of the epoch is aligned with the last 128 msec. of the guard-time waveform (relative to the beginning of the guard-time epoch defined by those frequency components which arrive first).

This detection process is illustrated in FIG. 10. In FIG. 10 first and second guard-time waveforms 110 and 112 at $f_1$, near the center of the band, and $f_2$, near the edge of the band, are depicted. The frequency component at $f_1$ is the component of the ensemble that arrives first at the receiver and the component at $f_2$ arrives last. In FIG. 10 the seoond waveform 112, at $f_2$, arrives at the receiver at $T_0 + T_{PH}$, which is 8 msec. after the time, $T_0$, that the first waveform 110, at $f_1$, arrives at the receiver. The sampling period of 128 msec. is initiated at the time $T_0 + T_{PH}$. Thus, the entire symbol on $f_2$, $X_0$–$X_{1023}$, is sampled. The entire symbol at $f_1$ is also sampled because the initial 8 msec. of that symbol has been retransmitted.

Also, intersymbol interference has been eliminated. The arrival of the second symbol, $(y_i)$, at $f_1$ has been delayed 8 msec. by the retransmission of the first 8 msec. of $(x_i)$. Thus, the leading edge of the second symbol at $f_1$, does not overlap the trailing edge of the first symbol at $f_2$.

The 8 msec. guardtime reduces the usable timebandwidth product of the system by only about 6%. This small decrease is due to the very long duration of each symbol relative to the necessary guardtime.

Tracking

In practice, for a given carrier, the magnitudes of the (x,y) vectors extracted during the demodulation process do not fall exactly at the constellation points but are distributed over a range about each point due to noise and other factors. Accordingly, the signal is decoded utilizing a modulation template as depicted in FIG. 11.

Referring now to FIG. 11, the template is formed by a grid of squares 113 with the constellation points 114 at the centers of the squares 113.

In FIG. 11, the vector $W = (x_n, y_n)$ represents the demodulated amplitudes of the sine and cosine signals at $f_n$. W is in the square 113 having the constellation point (3,3) centered therein. Accordingly, W is decoded as (3,3).

The present invention includes a system for tracking to determine changes in transmission loss, frequency offset, and timing from the values determined during synchronization.

This tracking system utilizes the position of the received vectors in the squares of the demodulation template of FIG. 11. In FIG. 12, a single square is divided into four quadrants upper left, lower right, upper right, lower right, 115, 116, 117, and 118 characterized as too fast, too slow, too big, and too little, respectively. If counts in all four quadrants over time by frequency or over frequency at one time are equal or nearly equal then the system is in alignment. That is, if noise is the only impairment, then the direction of error for the decoded vector, W, should be random.

However, if transmission loss changes by even 0.1 dB the number of too small counts will vary significantly from the number of too large counts. Similarly, a large difference between the number of too fast and too slow counts indicates a phase rotation caused by a change in the offset frequency. Thus, the differences between the too fast, too slow, and too big, too small counts is an error characteristic that tracks variations in signal loss and offset frequency.

The present invention utilizes this error characteristic to adjust the signal loss and frequency offset determined during synchronization. For each frequency an adjustment of ±0.1 dB or ±1.0° is made depending on the error characteristic. Other divisions of the decoding region into distinct or overlapping subregions characterized as too fast, too slow, too big, and too little are preferred in some embodiments.

Additionally, the phase of the timing signals is tracked to allow corrections of $T_0$.

Allocation of Channel Control

The present invention further includes a unique system for allocating control of an established communication link between the originate and answer modems (hereinafter designated A and B, respectively). Each waveform comprising the encoded ensemble of frequencies forms a packet of information.

Control of the transmission link is first allocated to modem A. Modem A then determines the volume of data in its input buffer and transmits between I (a minimum) and N (a previously determined maximum) packets of data as appropriate. The predetermined number N serves as a limit and the end number of transmitted packets may be significantly less than required to empty the input buffer. On the other hand, if modem A has little or no data in its input buffer it will still transmit I packets of information to maintain communication with modem B. For example, the I packets may comprise the originate or answer comb of frequencies defined above with respect to FIG. 4 and the synchronization process.

Control of the communication link is then allocated to modem B which repeats the actions of modem A. Of course, if modem B transmits the minimum number, I, of packets it is confirming to modem A the vitality of modem B.

There is no need for the limits N on the two modems to be the same, or to restrict them from being adaptable under modem control to obtain rapid character echo or other user oriented goals.

Hardware Implementation

FIG. 13 is a block diagram of a hardware embodiment of the invention. Referring now to FIG. 13, an electronic digital processor 120, an analog I/O interface 44, and a digital I/O interface 122 are coupled to a common data bus 124. The analog I/O interface 44 interfaces the public switched telephone line 48 with the common data bus 124 and the digital interface 122 interfaces digital terminal equipment 126 with the common data bus 124.

The following components are utilized in a preferred embodiment of the invention. The analog I/O interface 44 is a high performance 12 bit coder-decoder (codec) and telephone line interface. The interface has access to RAM 132 and is controlled by supervisory microprocessor 128. The codec is a single chip combination of an analog to digital converter, a digital to analog converter, and several band pass filters.

The digital I/O interface 122 is a standard RS-232 serial interface to a standard twenty-five pin RS-232 type connector or a parallel interface to a personal computer bus.

The electronic digital processor 120, includes a supervisory processor 128, a general purpose mathematical processor 130, a 32K by 16 bit shared RAM subsystem 132, and a read only memory (ROM) unit 133, coupled to an address bus 135.

The supervisory microprocessor 128 is a 68000 data processor subsystem including a 10 MHz 68000 processor and the 68000 program memory. The 32K by 16 bit program memory consists of several low power, high density, ROM chips included in the ROM unit 133.

The mathematical processor 130 is a 320 digital signal microprocessor system (DSP) including a 20 MHz 320 processor, the 320 program memory, and an interface to the shared RAM system. Two high speed ROM chips, included in ROM unit 133, comprise the 8192×16 bit program memory.

The 320 system program memory includes programs for performing the modulation table look-up, FFT, demodulation, and other operations described above. The 68000 processor handles digital data streams at the input and output, performs tasking to and supervision of the 320 signal processor and associated analog I/O, and performs self and system test as appropriate.

The invention has been explained with respect to specific embodiments. Other embodiments will now be apparent to those of ordinary skill in the art.

In particular, the ensemble of carrier frequencies need not be limited as above-described. The number of carriers may be any power of 2, e.g. 1024, or some arbitrary number. Additionally, the frequencies need not be evenly spaced over the entire VF band. Further, the QAM scheme is not critical to practicing the invention. For example, AM could be utilized although the data rate, $R_B$, would be reduced.

Still further, the modulation template need not be comprised of squares. Arbitrarily shaped regions surrounding the constellation points may be defined. The tracking system was described where the squares in the modulation template were divided into four quadrants. However, a given parameter may be tracked by tracking the difference in the number of counts in arbitrary regions defined about a constellation point.

Still further, a hardware embodiment including a supervisory microprocessor and a general purpose mathematical processor has been described. However, different combinations of IC chips may be utilized. For example, a dedicated FFT chip could be utilized to perform modulation and demodulation operations.

Still further, the information units utilized in the above description were bits. However, the invention is not limited to binary system.

Accordingly, it is therefore intended that the invention can be limited except as indicated by the appended claims.

What is claimed is:

1. In a high speed modem, for transmitting data over a telephone line, of the type that encodes data elements on an ensemble of carrier frequencies, a method for allocating data and power to the carrier frequencies, said method comprising the steps of:

determining the equivalent noise component for every carrier frequency in the ensemble;

determining the marginal power requirement to increase the complexity of the data element on each carrier from n information units to n+1 information units, n being an integer between 0 and N;

ordering the marginal powers of all the carriers in the ensemble in order of increasing power;

assigning available power to the ordered marginal powers in order of increasing power;

determining the value, MP(max) at which point the available power is exhausted; and allocating power and data to each carrier frequency where the power allocated is equal to the sum of all the marginal powers less than or equal to MP(max) for that carrier and the number of data units allocated is equal to the number of marginal powers for that carrier less than or equal to MP(max).

2. The invention of claim 1 where said step of ordering comprises the steps of:

providing a table of arbitrary marginal power levels; and rounding the value of each determined marginal power level to one of the values of the table of arbitrary marginal power levels to decrease computational complexity.

3. The invention of claim 2 wherein the step of determining equivalent noise comprises the steps of:

providing an A and a B modem interconnected by a telephone line;

establishing a communication link between said A and B modems;

accumulating line noise data during a no transmission time interval at said A and B modems;

transmitting at least a first ensemble of frequency carriers from said A modem to said B modem, where the amplitude of each carrier has a predetermined value;

receiving said first ensemble at said B modem;

measuring the amplitude of each carrier received at said B modem;

comparing the measured amplitudes at said B modem with said predetermined amplitudes to determine signal loss, in dB, at each carrier frequency;

determining the value of the component, in dB, at each carrier frequency of the accumulated noise; and adding the signal loss at each carrier frequency to the noise component at each carrier frequency to determine equivalent noise.

4. A high speed modem of the type for transmitting a signal on a VF telephone line, comprising:

means for receiving an input digital data stream and for storing said input digital data;

means for generating a modulated ensemble of carriers to encode said input digital data, where each carrier has data elements of variable complexity encoded thereon;

means for measuring the signal loss and noise loss of the VF telephone line for each carrier; and means for varying the complexity of the data element encoded on each carrier and the amount of power allocated to each carrier to compensate for the measured signal loss and noise level.

5. A high speed modem of the type that encodes data elements on an ensemble of carriers of different frequency, said modem comprising:

a digital electronic processor;

a digital electronic memory;

bus means for coupling said processor and said memory;

means, associated with said digital electronic processor, for determining the equivalent noise component for every carrier frequency in the ensemble;

determining the marginal power requirements to increase the complexity of the data element on each carrier from n information units to n+1 information units, n being an integer between 0 and N;

ordering the marginal powers of all the carriers in the ensemble in order of increasing power;

assigning available power to the ordered marginal powers in order of increasing power;

determining the value, MP(max) at which point the available power is exhausted; and assigning power and data to each carrier frequency where the power assigned is equal to the sum of all the marginal powers less than or equal to MP(max) for that carrier and the number of data units is equal to the number of marginal powers for that carrier less than or equal to MP(max).

6. The invention of claim 5 wherein said means associated with said digital processor comprises:

a programmed read-only memory (ROM).

7. In a high speed modem, for transmitting data in the form of a QAM ensemble of carrier frequencies on a VF telephone line, of the type that measures the magnitude of a system parameter prior to transmission, a method for tracking deviations in the magnitude of the system parameter during the receipt of data, said method comprising the steps of:

generating QAM constellations for a plurality of carrier frequencies;

constructing a demodulation template for one of said plurality of carrier frequencies comprising a plurality of first regions with one of the points of said constellation positioned within each of said first regions;

forming a set of tracking regions where each first region has a first and second tracking region disposed therein;

demodulating said ensemble of carriers to obtain the demodulation points positioned in said set of first and second tracking regions;

counting the number of points disposed in said set of first tracking regions and the number of points disposed in said set of second tracking regions;

determining the difference in the number of counts disposed in said set of first tracking regions and disposed in said tracking regions to construct an error characteristic; and utilizing said error characteristic to adjust the magnitude of said signal parameter during the receipt of data.

8. The invention of claim 7 wherein said step of constructing a demodulation template comprises the step of:

constraining said first regions to be in the shape of squares having said constellation points centered therein.

9. The invention of claim 8 wherein said step of forming said tracking regions comprises the step of:

dividing said squares into quadrants; and selecting said tracking regions to be symmetrically disposed quadrants.

10. In a high speed modem for transmitting data over a telephone line of the type that encodes data elements on an ensemble of carrier frequencies, a method for allocating data and power to the carrier frequencies, said method comprising the steps of:

determining the sum of the equivalent noise power and signal power for each carrier; and allocating in increment of available power to the carrier having this minimum sum of the equivalent noise power and signal power.

11. In a high speed modem, for transmitting data over a telephone line, of the type that encodes data elements on an ensemble of carrier frequencies, a system for allocating data and power to the carrier frequencies, said system comprising:

means for determining the equivalent noise component for every carrier frequency in the ensemble;

means for determining the marginal power requirement to increase the complexity of the data element on each carrier from n information units to n+1 information units, n being an integer between 0 and N;

means for ordering the marginal powers of all the carriers in the ensemble in order of increasing power;

means for assigning available power to the ordered marginal powers in order of increasing power;

means for determining the value, MP(max) at which point the available power is exhausted; and means allocating power and data to each carrier frequency where the power allocated is equal to the sum of all the marginal powers less than or equal to MP(max) for that carrier and the number of data units allocated is equal to the number of marginal powers for that carrier less than or equal to MP(max).

12. The invention of claim 11 where said means for ordering comprises:

means for providing a table of arbitrary marginal power levels; and means for rounding the value of each determined marginal power level to one of the values of the table of arbitrary marginal power levels to decrease computational complexity.

13. The invention of claim 12 wherein an A and B modem are connected by a telephone line and the means for determining equivalent noise comprises:

means for establishing a communication link between said A and B modems;

means for accumulating line noise data during a no transmission time interval at said A and B modems;

means for transmitting a first ensemble of frequency carriers from said A modem to said B modem, where the amplitude of each carrier has a predetermined value;

means for receiving said first ensemble at said B modem;

means for measuring the amplitude of each carrier received at said B modem;

means for comparing the measured amplitudes at said B modem with said predetermined amplitudes to determine signal loss at each carrier frequency;

means for determining the value of the component, in dB, at each carrier frequency of the accumulated noise; and means for adding the signal loss at each carrier frequency to the noise component at each carrier frequency to determine equivalent noise.

14. In a high speed modem, for transmitting data in the form of a QAM ensemble of carrier frequencies on a VF telephone line, of the type that measures the magnitude of a system parameter prior to transmission, a system for tracking deviations in the magnitude of the system parameter during the receipt of data, said system comprising:

means for generating QAM constellations for a plurality of carrier frequencies;

means for constructing a demodulation template for one of said plurality of carrier frequencies comprising a plurality of first regions with one of the points of said constellation positioned within each of said first regions;

means for forming a set of tracking regions where each first region has a first and second tracking region disposed therein;

means for demodulating said ensemble of carriers to obtain the modulation points positioned in said set of first and second tracking regions;

means for counting the number of points disposed in said set of first tracking regions and the number of points disposed in said set of second tracking regions;

means for determining the difference in the number of counts disposed in said set of first tracking regions and disposed in said tracking regions to construct an error characteristic; and means for utilizing said error characteristic to adjust the magnitude of said signal parameter during the receipt of data.

15. The invention of claim 14 wherein said means for constructing a demodulation template comprises:

means for constraining said first regions to be in the shape of squares having said constellation points centered therein.

16. The invention of claim 15 wherein said means for forming said tracking regions comprises:

means for dividing said squares into quadrants; and means for selecting said tracking regions to be symmetrically disposed quadrants.

17. In a high speed modem for transmitting data over a telephone line of the type that encodes data elements on an ensemble of carrier frequencies, a system for allocating data and power to the carrier frequencies, said system comprising:

means for determining the sum of the equivalent noise power and signal power for each carrier; and means for allocating in increment of available power to the carrier having this minimum sum of the equivalent noise power and signal power.

* * * * *

UNITED STATES PATENT AND TRADEMARK OFFICE
CERTIFICATE OF CORRECTION

PATENT NO. : 4,679,227

DATED : July 7, 1987

INVENTOR(S) : Dirk HUGHES-HARTOGS

It is certified that error appears in the above-identified patent and that said Letters Patent is hereby corrected as shown below:

In the Drawings:

In the Cover Figure, and Fig. 3, relabel the printed designation in block 43, "ADC" should be --DAC--, and in block 52, "DAC" should be --ADC--.

In Fig. 6, relabel the printed designation "60" as --70--.

In Fig. 13, relabel the printed designation "30 " as --30--.

In the Specification:

Column 11, Line 20, "0, 2, 4, 5, 6 and 8 bits)." should be --0, 2, 4, 5, and 6 bits).--

Column 13, Line 59, "92" should be --94--.

Column 13, Line 60, "94" should be --92--.

Column 13, Line 61, "eaoh" should be --each--.

Column 13, Line 62, "frequenoy" should be --frequency--.

Column 13, Line 64, "92" should be --90--, and "94" should be --92--.

Column 13, Line 68, "92" should be --90--, and "96" should be --92--.

UNITED STATES PATENT AND TRADEMARK OFFICE
CERTIFICATE OF CORRECTION

PATENT NO. : 4,679,227

DATED : July 7, 1987

INVENTOR(S) : Dirk Hughes-Hartogs

It is certified that error appears in the above-identified patent and that said Letters Patent is hereby corrected as shown below:

Column 14, line 17, "Fig. 3" should be --Fig. 9--.

Signed and Sealed this

Twenty-sixth Day of March, 1991

Attest:

HARRY F. MANBECK, JR.

*Attesting Officer*　　　　*Commissioner of Patents and Trademarks*